US009471947B2

(12) United States Patent
Majidzadeh et al.

(10) Patent No.: US 9,471,947 B2
(45) Date of Patent: Oct. 18, 2016

(54) DATA COLLECTION SYSTEM AND METHOD

(71) Applicant: Resource International Inc., Columbus, OH (US)

(72) Inventors: Kamran Majidzadeh, New Albany, OH (US); Bernard Schubach, New Albany, OH (US)

(73) Assignee: Resource International Inc., Columbus, OH (US)

( * ) Notice: Subject to any disclaimer, the term of this patent is extended or adjusted under 35 U.S.C. 154(b) by 465 days.

(21) Appl. No.: 14/175,262

(22) Filed: Feb. 7, 2014

(65) Prior Publication Data

US 2015/0226674 A1 Aug. 13, 2015

(51) Int. Cl.
*G06F 19/00* (2011.01)
*G06Q 50/16* (2012.01)
*G06Q 10/00* (2012.01)

(52) U.S. Cl.
CPC ............ *G06Q 50/163* (2013.01); *G06Q 10/20* (2013.01)

(58) Field of Classification Search
CPC ............. G06F 21/577; G06F 21/6218; G06F 21/6254
See application file for complete search history.

(56) References Cited

U.S. PATENT DOCUMENTS

2008/0222734 A1* 9/2008 Redlich ................. G06F 21/577 726/26
2011/0066951 A1* 3/2011 Ward-Karet ........ H04L 43/0894 715/744

* cited by examiner

*Primary Examiner* — Edward Raymond
(74) *Attorney, Agent, or Firm* — Mueller Law, LLC; Jerry K. Mueller, Jr.

(57) ABSTRACT

Disclosed is a system for carrying out inspection of a physical asset according to a database of defined criteria for each type of physical asset. The system includes a database server, including a database of acceptable criteria, including images, for each type of physical asset; a database of unacceptable criteria, including images, for each type of physical asset; a database of information, including images, of each physical asset inspected. The system also includes a portable data collector for use by a field inspector, including the database of acceptable criteria, including images, for each type of physical asset; the database of unacceptable criteria, including images, for each type of physical asset; and the database of information, including images, of each physical asset inspected; and a program of sequential steps to be followed by the field inspector for inspecting each physical asset.

11 Claims, 14 Drawing Sheets

Project Details

Project Name: [new Project] (Required)
Project Number:
Project Address:

City:
State / Province:
Country: US - United States of America
Postal Code:
Phone:
Client Name:
Project Manager Name:
Project Budget: $
Check-out Period: 8 hours
Check-out Period defines how long Files may be checked-out on this Project.
Web Site:
If there is a web site (besides www.projectgrid.com) set up for this Project, enter its URL above.
Link Text:
If there is a web site (besides www.projectgrid.com) set up for this Project, and you want the link that points to it to say something other than "Project Web Site", enter the desired text above.
Project Description:

Project Links to Display: All
Tabs to Display:
- ☑ Projects
- ☑ Files
- ☑ Pictures
- ☑ Financial
- ☑ Calendar
- ☑ Schedule
- ☑ Today's Tasks
- ☑ Minutes
- ☑ Request For Information
- ☑ Contacts
- ☑ Bulletin Board
- ☐ iiCollector™
- ☑ Search
- ☑ Settings iiCollector Route:
iiCollector Start Mile:
iiCollector End Mile:

FIG. 4B iiCollector Start Station (enter as numeric feet, e.g. enter 20+20.61 as 2020.61):

iiCollector Total Lane Miles:

iiCollector Route Type: [Priority ▼]

iiCollector Elements to include:
- ☐ Anchor assembly
- ☐ Auxiliary Marking
- ☐ Ditch
- ☐ End assembly
- ☐ Guardrails
- ☐ Impact attenuator
- ☐ Lane/Edge/Center lines
- ☐ Litter
- ☐ Other
- ☐ Pavement Deterioration
- ☐ Pavement Drop-Off
- ☐ Pavement Obstruction
- ☐ Planted Surface
- ☐ Rest Area
- ☐ Sign
- ☐ Unpaved Separation
- ☐ Vegetation Obstruction ☐ Spell-check

[Save changes to Project] [Cancel]

FIG. 5

Modify or Remove Someone
To modify the Demonstration Project information about an Entity below, simply click on its name.

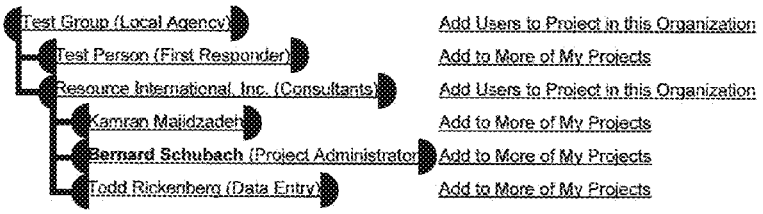

Add Someone
To add someone new to the Demonstration Project, type their name below. A list of possible matches will then be shown. Click on the one you wish to add to the Project.

Person, Organization, Role, or Job: [          ]
e.g. John Jacobs, Martha's Plumbing, Asbestos Abatement, or Project Coordinator
[Submit]

DATA COLLECTION SYSTEM AND METHOD

CROSS-REFERENCE TO RELATED APPLICATIONS

None.

STATEMENT REGARDING FEDERALLY SPONSORED RESEARCH

Not applicable.

BACKGROUND

The present disclosure relates to inspection of physical structures and locations along with data collection and reporting and more particularly to an improved data collection system and method.

As exemplified by roadways, including signage, guardrails, curbs, litter, and the like, there is a need to perform inspections, often for safety. Moreover, there also is a need to have a record or history of such items along with a record of repairs. There is a further need to be able to authorize such inspections along with approval of repairs when needed.

In the same way, there also is a need to inspect a variety of physical structures including, inter alia, buildings, bridges, parking lots, parking garage structures, rails, runways, and the like. It is to such needs that the present disclosure is addressed.

BRIEF SUMMARY

A method for evaluating physical assets according to defined criteria database is disclosed. The method starts by creating a project for evaluation of a physical asset according to a manual defining proper criteria for such physical asset. A field inspector is assigned for evaluating the physical asset. If the project was created responsive to a notice of critical deficiency, a crew is dispatched to repair the physical asset and the database of the physical asset is updated following the repairs. If the project was not created responsive to a notice of critical deficiency, a field inspector is dispatched to inspect the physical asset.

The field inspector enters the physical asset into a portable database device if the physical asset is not already in the device database. The field inspector populates the physical asset attributes, and rates the physical asset according to a defined criteria database.

If the physical asset is already in the device database, the field inspector edits the physical asset inventory and rates the physical asset according to the defined criteria database. If there is no first responder configured for the project, the field user saves the information entered into the portable device. If there is a first responder configured for the project and there is a high urgency deficiency for the physical asset, the field inspector decides whether an email needs to be sent to a first responder. If no email is required, the data entered by the field inspector is saved; and if an email is required, an email with photograph and description is sent to first responder and the data entered by the field inspector is saved. The data entered in the field inspector in the portable database device is sent in real time to a database server wireless when a wireless network is available to the portable database device.

BRIEF DESCRIPTION OF THE DRAWINGS

For a fuller understanding of the nature and advantages of the present method and device, reference should be had to the following detailed description taken in connection with the accompanying drawings, in which:

FIG. 3 is an exemplary information sheet for guardrails;

FIGS. 4A and 4B are information sheets of any given project where inspection of a roadway item is authorized;

FIG. 5 is an authorization screen for authorizing/assigning personnel to any given inspection project;

Figure 1:
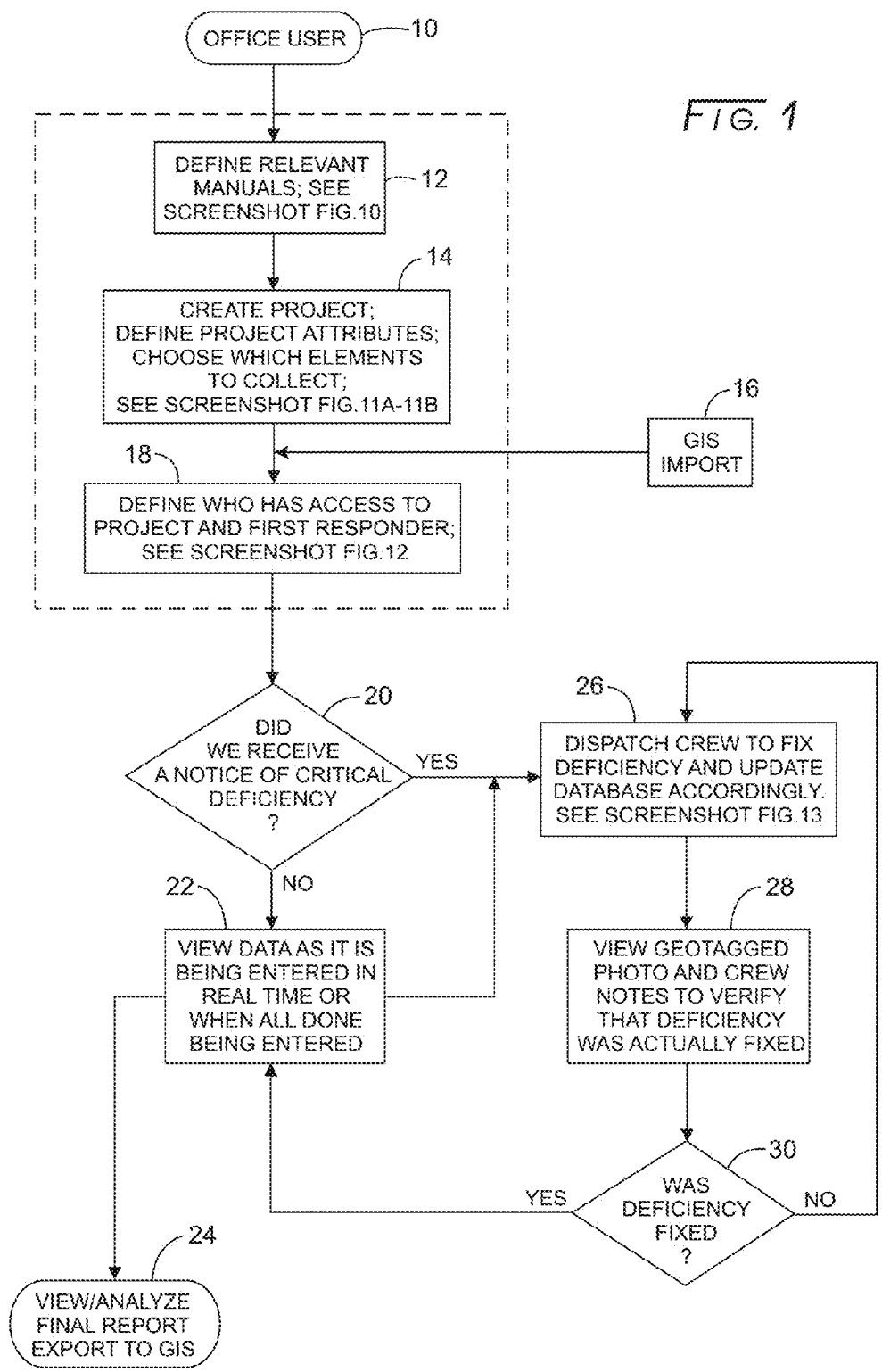
FIG. 1 is a flow sheet of the authorization for inspection of a physical structure, exemplified by roadways herein.

The device referred to is a portable electronic device carried by the field inspector when making a ground field inspection.

The drawings will be described in greater detail below.

DETAILED DESCRIPTION

For present purposes, the term "field assets" or "physical assets" (both singular and plural) will be used to refer to the physical structures to be inspected. Such physical structures can be civil or military and include, inter alia, transportation facilities, such as, for example, railroad beds, rails, signals, and the like; roadways, including, for example, roadways, berms, signage, curbs, guard rails, and the like; airport facilities, including, for example, runways, lights, signage, and the like; buildings (educational, commercial, industrial, military), including, for example, parking garages, sidewalks, windows, and the like. The term "field assets" should be construed broadly for purposes of the instant disclosure.

In order to illustrate the disclosure, the following description will refer specifically to roadways and their appurtenances. Such description, however, is by way of illustration and not by way of limitation.

Broadly, then, the disclosure relates to the ability to measure, inventory, and determine the functioning and/or condition of the physical asset, including, for example, the location of the asset, the condition of the asset, whether the asset is functioning for its intended purpose compared to a set of standards, whether the asset requires repair/replacement, and whether such repair/replacement is needed immediately. For new inventory, identification indicia can be entered into a hand-held, portable device, including its location on a map, color-coding for the type of asset, photograph of the asset, and relationship to other assets in the immediate area. The condition of the new inventory can be compared to a standard housed in the device memory and the differences therebetween determined by the inspector with the device. The inspector, then, can make a determination and criticality as to maintenance/repair/replacement required for the asset. All of this data is uploaded to a fixed database automatically in real time when the device has access to the Internet. Personnel monitoring the fixed database can communicate with the field inspector during this process. The portable device and/or the fixed database can send an email to the owner of the field asset and/or agency having responsibility for the field asset as to any needed repairs/maintenance/replacement of the field asset and the criticality of timing for such repairs/maintenance/replacement. Reports of the inspection also can be printed out from the fixed database.

For assets already in the database, the portable electronic device will have the records of prior inspections and the field inspector can compare the present condition of the asset to the condition of the asset in prior inspections. Again, the inspector, then, can make a determination and criticality as to maintenance/repair/replacement required for the asset and all other actions described above taken.

Referring initially to FIG. 1, a flow sheet of the authorization for inspection of a physical structure (an asset) as exemplified by roadways in this disclosure is shown. In particular, an office user at box 10 confronts a computer screen for entering appropriate information for authorizing a field inspection of a particular asset associated with a roadway, such as, for example, the roadway condition, signage, guardrails, litter, or the like. As noted above, the inspection of a roadway item will be used herein for illustrating the disclosure and should not be taken in any way as a limitation on the present disclosure.

Figure 3:
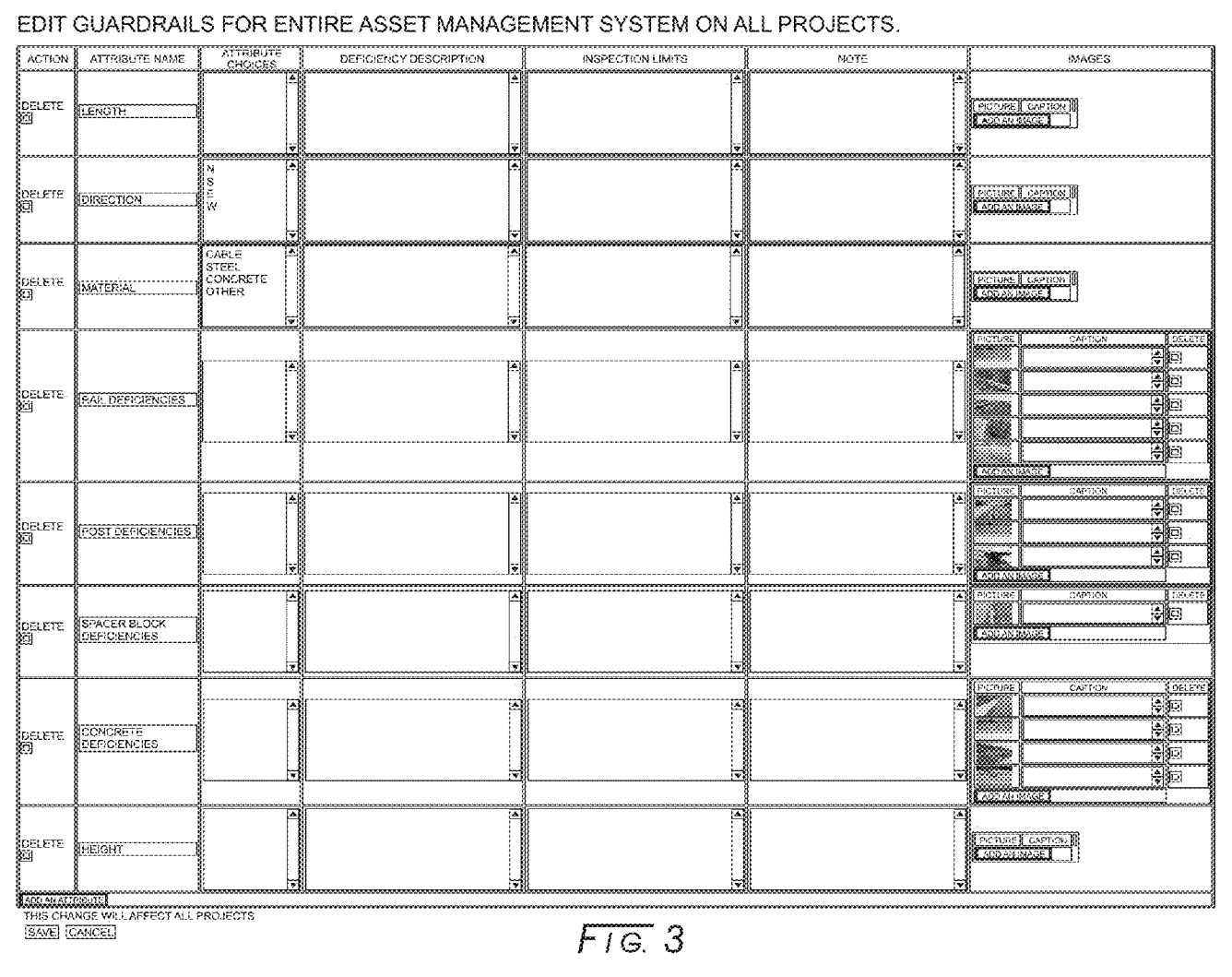

The office user next proceeds to step 12 in the flow diagram to define the relevant manuals appropriate for the particular asset to be inspected; asset being an item associate with a roadway, such as, for example, a guardrail, signage, litter, or the like. The items associated with the particular item of interest—a guardrail in this case—are displayed to the office user in FIG. 3, including, for example, length, direction, material of construction, rail deficiencies, post deficiencies, spacer block deficiencies, concrete deficiencies, height, location, and like attributes. Additionally, images of acceptable and unacceptable guardrails can be brought up from the asset management system.

The office user next creates a project at step 14 by completing the forms displayed in FIGS. 4A and 4B. Alternatively, the office user could import GIS (Geographic Information System) information 16 that would take the place of the information inputted in FIGS. 4A and 4B. The flow diagram then proceeds to step 18 where the office user accesses the form displayed in FIG. 5 to input the authorized personnel for the project being defined.

The flow diagram then proceeds to step 20 which queries whether a notice of critical deficiency has been received for the defined project—a guardrail in this example. If no notice of critical deficiency has been received, the flow diagram proceeds to step 22 where the office user views data as it is entered in real time by the field inspector during the inspection. Once the inspection is complete, the flow diagram proceeds to step 24 where a final report is viewed or analyzed, or alternatively the final report is exported back to the GIS.

Figure 13:
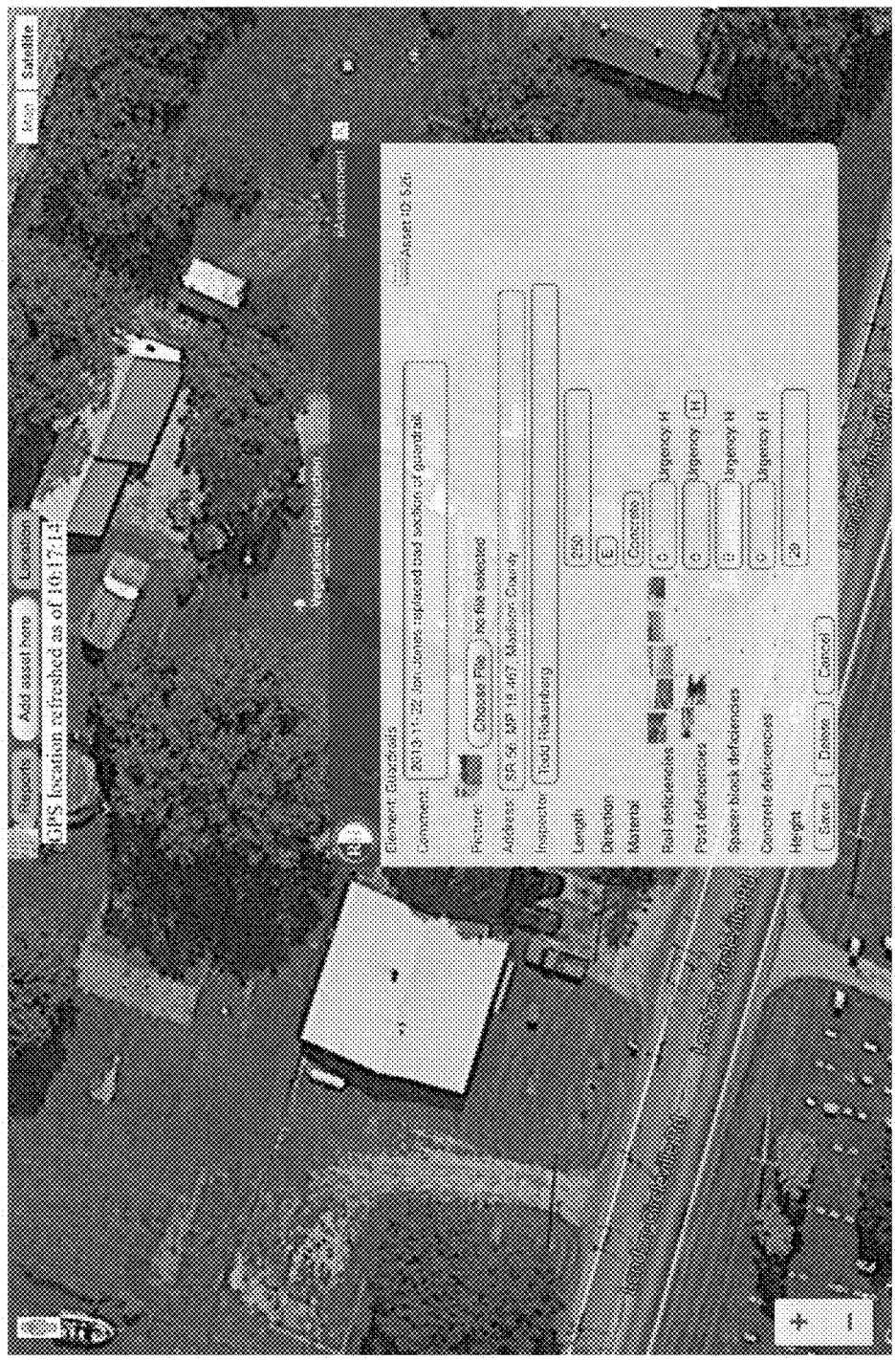
FIG. 13 is a screen shot of an aerial image of a ground inspection location report as completed by a field inspector and showing the history for a guardrail that was repaired pursuant to a field inspection.

Reverting back to step 20, if a notice of critical deficiency was received, the flow diagram proceed to step 26 where a crew is dispatched to fix the deficiency and the field inspector updates the database for the fixed guardrail in the device screenshot displayed in FIG. 13. The flow diagram proceeds next to step 28 where the geotagged photo and notes in FIG. 13 are reviewed by another field inspection to verify that the deficiency was actually fixed. If the deficiency was not fixed or properly fixed, the flow diagram proceeds back to step 26 for dispatching a repair crew. If the subsequent inspection reveals a properly corrected deficiency, the flow diagram proceeds to step 22.

Figure 2A:
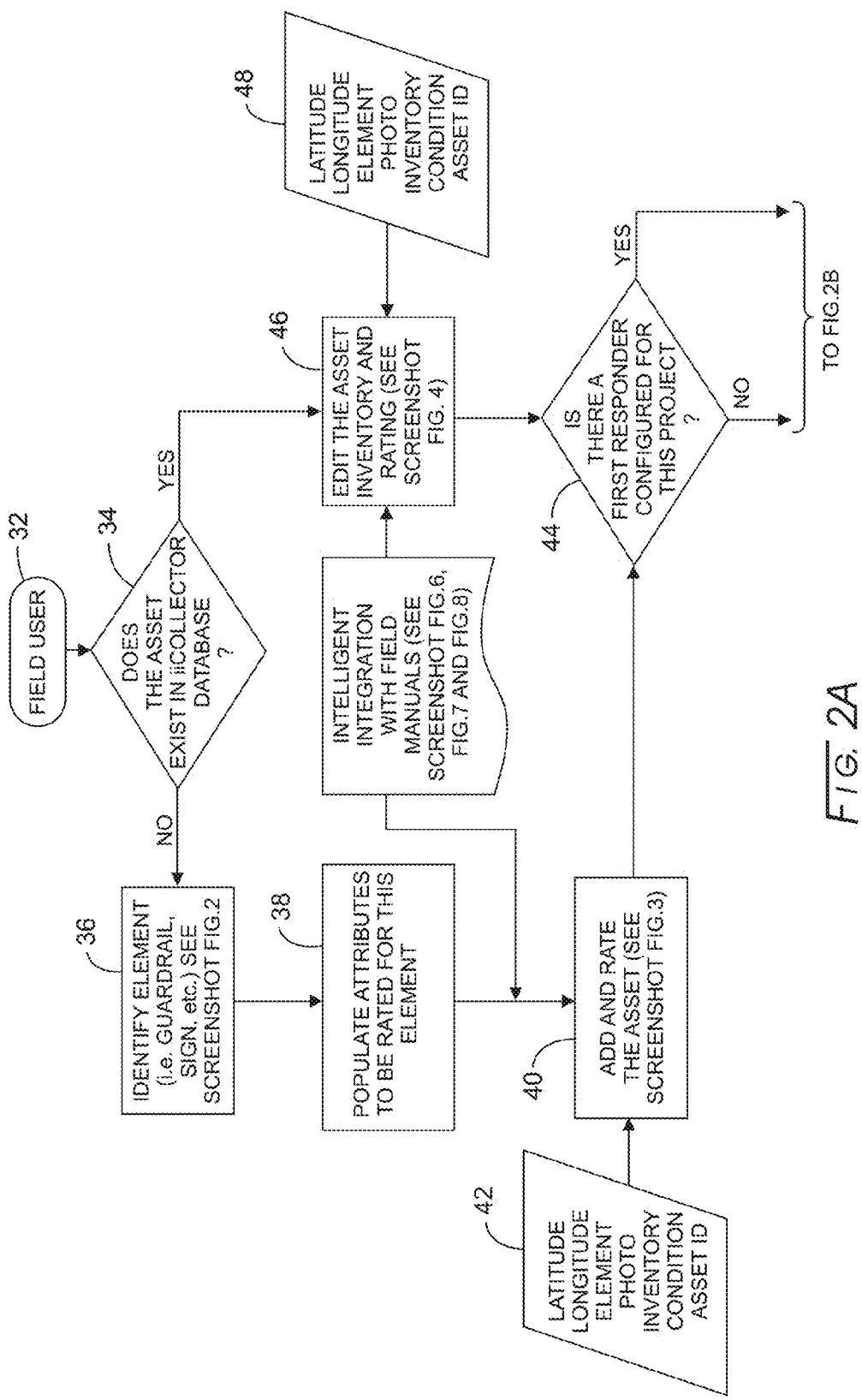
FIGS. 2A and 2B are flow sheets showing the instructions in the inspection device given to a field user sent out to inspect a roadway item.

The field user/inspector flow sheet of the authorization for inspection of a physical structure, exemplified by roadways herein carries a portable device, such as an iPad® (Apple Computers, Inc., Cupertino, Calif.), containing the flow diagram displayed in FIG. 2 along with a database, as will be described further herein. The field user in step 32 proceed to step 34 where a query is made as to whether the asset for inspection already exists in the database of the field collector, iiCollector™ (Resource International, Inc., Columbus, Ohio). It should be noted that all information entered by the field user in the field collector is sent wirelessly to the database server in real time, where the office user can view such entered information also in real time.

Figure 6:
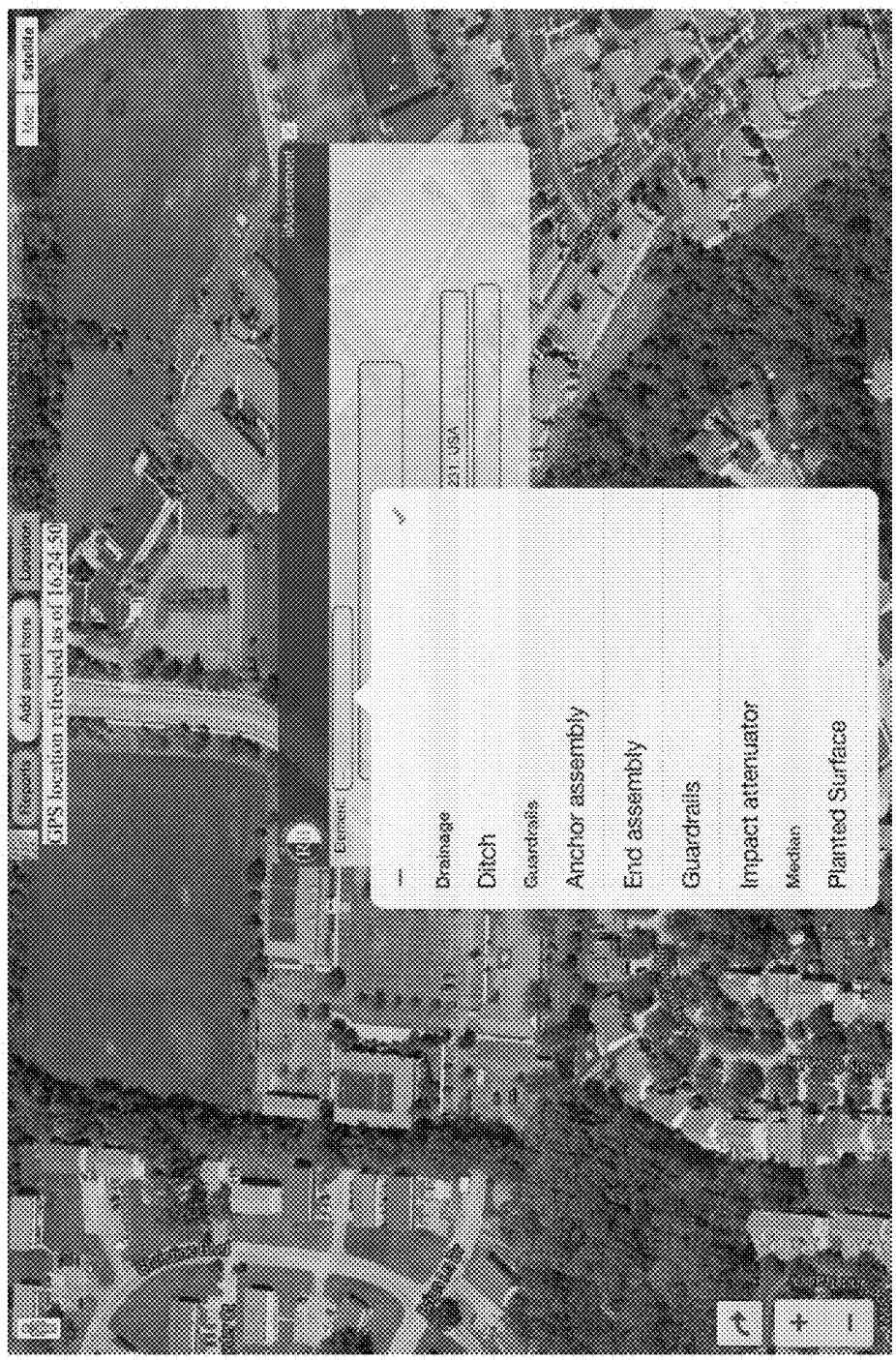
FIG. 6 is a screen shot of an aerial image of a ground location where an inspection has been authorized, including a data entry menu to be completed by the field inspector.

If the field asset is not already in the field collector database, the flow diagram proceeds to step 36 where the screen shot in FIG. 6 pops up on the field device for the field inspector to identify the asset being inspected—again, a guardrail for present purposes. In step 38, the attributes for the guardrail are populated. In step 40, the field user/inspector adds and rates the guardrail from the menu shown in FIG. 6. One of the identifying indicia inputted in step 42 is the latitude/longitude identifying ID for the guardrail.

Figure 7:
FIG. 7 is a screen shot of an aerial image of a ground inspection location where the litter conditions can be entered by a field inspector.

Returning to step 34, if the asset already exists in the database, the flow diagram proceeds to step 46 where the field user can edit the inventory and rating sheet shown in FIG. 7. The same latitude/longitude identifying ID in step 48 can be inputted at this step too.

Figure 2B:
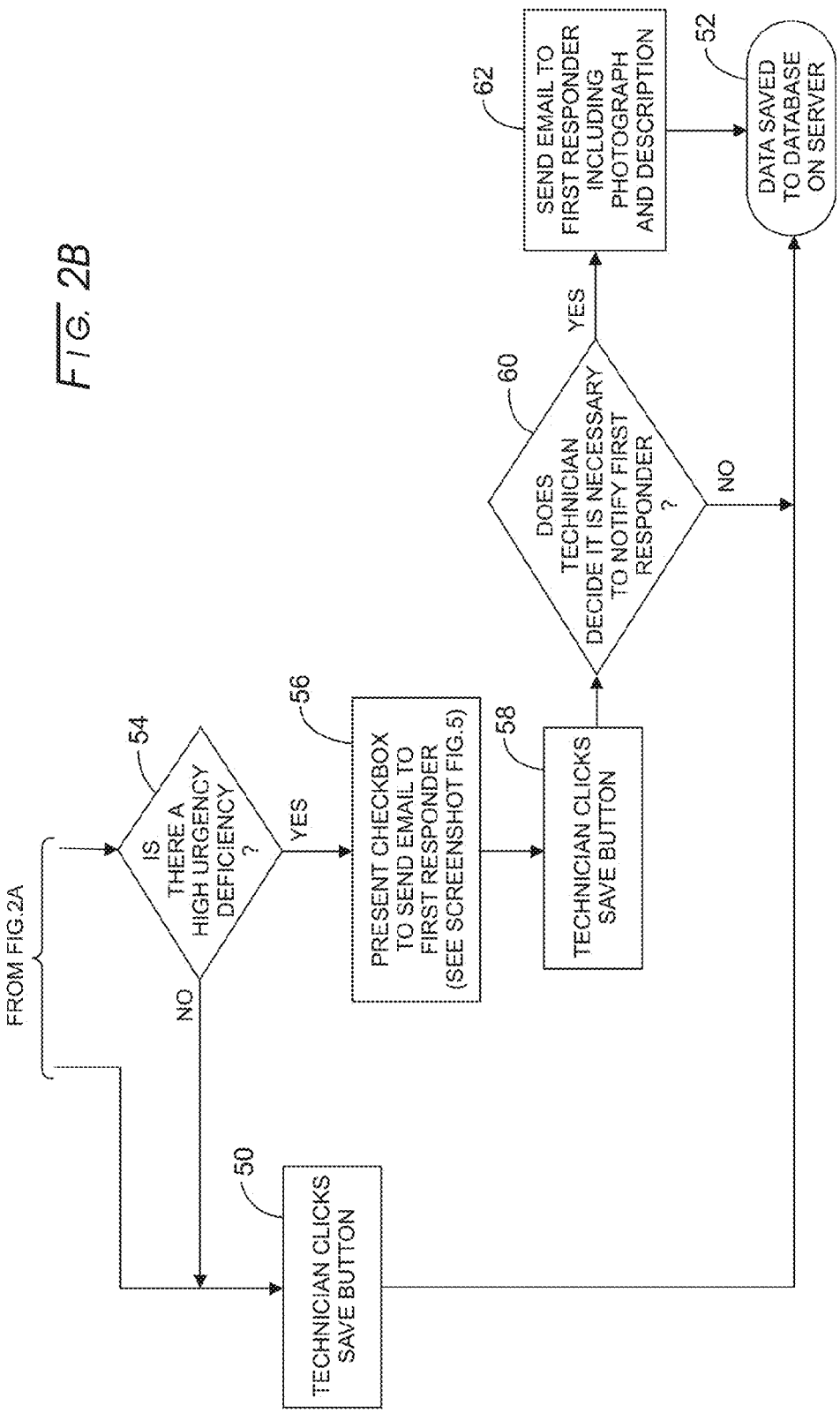

The flow diagram then proceeds from either step 42 or step 46 to step 44 where the query as to the first responder to the project is made. Regardless of the answer, the flow diagram proceeds as shown in FIG. 2B. If the answer to the first responder inquiry in step 44 is no, then the flow diagram proceeds to step 50 where the save button is pushed and the flow diagram proceeds to step 52 where the data in the collector is sent to the database server.

Figure 8:
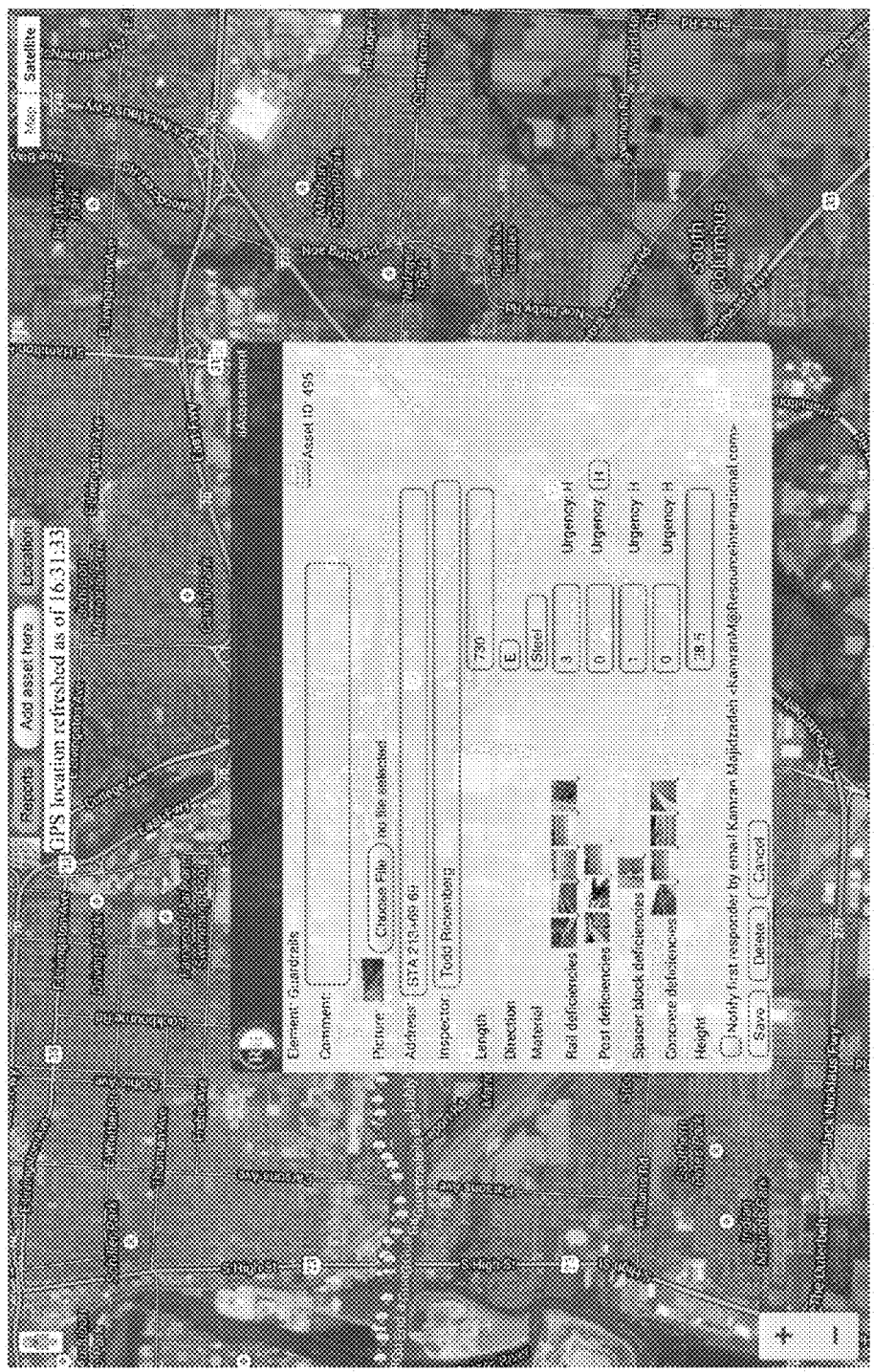
FIG. 8 is a screen shot of an aerial image of a ground inspection location where guardrail conditions can be entered by a field inspector.
Figure 9:
FIG. 9 is a screen shot of an aerial image of a ground inspection location where an inventory item can be added and/or rated as found by the field inspector.
Figure 10:
FIG. 10 is an image from the device database showing an unacceptable road sign.
Figure 11:
FIG. 11 is an image from the device database showing a 5-sign cluster in acceptable condition.
Figure 12:
FIG. 12 is an image from the device database showing an upside down roadway sign needing correction.

If the answer to the first responder inquiry in step 44 is yes, then the flow diagram proceeds to step 54 where there is an inquiry as to whether there is a high urgency deficiency. If the answer is no, then the flow diagram proceeds to step 50. If the answer is yes in step 54, then the flow diagram proceeds to step 56 where a checkbox is checked for sending an email to a first responder per the screenshot shown in FIG. 8 or in FIG. 9 for an auxiliary marking asset. The field user/technician then clicks the save button in step 58 and the user decides in in step 60 if is necessary to send an email to a first responder along with an image of the deficient asset. If the answer is no in step 60, the flow diagram proceeds to step 52. If the answer in step 60 yes, an email and photograph of the deficient asset is sent to a first responder in step 62 and the flow diagram proceeds to step 52.

As an additional capability possessed by the portable field device, a Safety Performance Index (SPI) can be calculated for each class of items inspected in a given area. For example, if the guardrail along a certain stretch of highway is being inspected, the number of deficiencies per mile, for example, can be totaled and rated compared to a rating system. Say, for example, there were 29+ deficiencies per mile, the SPI score would be 0 or very poor. If, however, there was only 1 vegetation obstruction along that same route, the SPI score would be 4 or acceptable. Of course, the assigned score criteria would be different for each category of assets being inspected.

It will be apparent to those skilled in the art that a history of each asset has been created and can be viewed in later times to assist later field users and repair crews. It also will be apparent to those skilled in the art that the data on each asset has been standardized for safety, longevity, and consistency. In this way, each asset will likely function for its intended purpose and have a likelihood that it will continue functioning for a longer period of time. It further will be apparent to those skilled in the art that remediation of assets will be standardized by the field collector and method disclosed herein.

While the device (portable field database collector) and method have been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

We claim:

1. A method for evaluating physical assets according to defined criteria database, which comprises the steps of:
    (a) creating a project for evaluation of a physical asset according to a manual defining proper criteria for such physical asset;
    (b) if the project was created responsive to a notice of critical deficiency, dispatching a crew to repair the physical asset and updating the database of the physical asset following the repairs;
    (c) if the project was not created responsive to a notice of critical deficiency, dispatching a field inspector to inspect the physical asset;
    (d) the field inspector enters the physical asset into a portable database device if the physical asset is not already in the device database;
        populates the physical asset attributes, and rates the physical asset according to said manual; or
        if the physical asset is already in the device database, the field inspector edits the physical asset inventory and rates the physical asset according to the manual;
    (e) if there is no first responder configured for the project, the field inspector saves the information in step (d);
    (f) if there is a first responder configured for the project and there is a high urgent deficiency for the physical asset, the field inspector decides whether an email needs to be sent to a first responder; and
    (g) if an email is required in step (f), an email with photograph and description is sent to a first responder and the field inspector saves the information in step (d), the data entered in the field inspector in the portable database device in step (d) is sent in real time to a database server wireless when a wireless network is available to the portable database device.

2. The method of claim 1, wherein said physical assets are one or more of civil or military transportation facilities, airport facilities, or building facilities.

3. The method of claim 2, wherein said physical assets are one or more of roadways, buildings, bridges, parking lots, parking garage structures, rails, guardrails, curbs, litter, railroad beds, rails, signals, berms, signage, curbs, runways, or lights.

4. A portable data collector for use in inspecting a physical asset, which comprises:
    (a) a database of acceptable criteria for each type of physical asset including images of an acceptable physical asset;
    (b) a database of unacceptable criteria for each type of physical asset including images of an unacceptable physical asset;
    (c) a database for each physical asset being inspected where a field inspector can enter the actual information of the physical asset thereinto;
    (d) image gathering for taking images of the physical asset being inspected;
    (e) wireless capability for wirelessly and in real time sending information entered into the physical asset criteria database and gathered images to a database server; and
    (f) a program of sequential steps to be followed by the field inspector for carrying out an inspection of each type of physical asset.

5. The portable data collector of claim 4, wherein the program of sequential steps are those of claim 1.

6. The portable data collector of claim 4, wherein said physical assets are one or more of civil or military transportation facilities, airport facilities, or building facilities.

7. The portable data collector of claim 6, wherein said physical assets are one or more of roadways, buildings, bridges, parking lots, parking garage structures, rails, guardrails, curbs, litter, railroad beds, rails, signals, berms, signage, curbs, runways, or lights.

8. A system for carrying out inspection of a physical asset according to a database of defined criteria for each type of physical asset, which comprises:
    (a) a database server, including a database of acceptable criteria, including images, for each type of physical asset; a database of unacceptable criteria, including images, for each type of physical asset; a database of information, including images, of each physical asset inspected; and a program of sequential steps to be followed for assigning a field inspector for each physical asset and for dispatching a crew to repair any deficiency determined for each physical asset; and
    (b) a portable data collector for use by a field inspector, including the database of acceptable criteria, including images, for each type of physical asset; the database of unacceptable criteria, including images, for each type of physical asset; the database of information, including images, of each physical asset inspected; and a program of sequential steps to be followed by the field inspector for inspecting each physical asset.

9. The system of claim 8, wherein program of sequential steps for said portable data collector are those of claim 1.

10. The portable data collector of claim 8, wherein said physical assets are one or more of civil or military transportation facilities, airport facilities, or building facilities.

11. The portable data collector of claim 10, wherein said physical assets are one or more of roadways, buildings, bridges, parking lots, parking garage structures, rails, guardrails, curbs, litter, railroad beds, rails, signals, berms, signage, curbs, runways, or lights.

* * * * *